United States Patent
Herdeg et al.

(10) Patent No.: US 6,403,243 B1
(45) Date of Patent: Jun. 11, 2002

(54) FUEL CELL SYSTEM AND METHOD OF REGENERATING A FILTER ELEMENT IN A FUEL CELL SYSTEM

(75) Inventors: Wolfgang Herdeg, Walddorfhäslach; Holger Klos, München; Martin Sattler, Königsberg; Franz Reichenbach, Bad Vilbel; Hans-Dieter Wilhelm, Neu-Anspach; Jürgen Habrich, Hainburg; Karl Eck, Frankfurt; Markus Keutz, Rossdorf; Thomas Zapp, Dortmund, all of (DE)

(73) Assignee: Mannesman AG, Düsseldorf (DE)

( * ) Notice: Subject to any disclaimer, the term of this patent is extended or adjusted under 35 U.S.C. 154(b) by 0 days.

(21) Appl. No.: 09/539,006

(22) Filed: Mar. 30, 2000

(30) Foreign Application Priority Data

Mar. 31, 1999 (DE) .......................... 199 16 386

(51) Int. Cl.[7] ............................... H01M 8/00
(52) U.S. Cl. ....................... 429/13; 429/12; 429/17; 429/19; 429/22; 429/25
(58) Field of Search ........................... 429/12, 13, 17, 429/19, 22, 25

(56) References Cited

U.S. PATENT DOCUMENTS 3,682,142 A * 8/1972 Newkirk ..................... 123/3
5,141,823 A * 8/1992 Wright et al. ................. 429/19
5,401,589 A * 3/1995 Palmer et al. ................ 429/13
5,964,089 A * 10/1999 Murphy et al. ............... 60/286

* cited by examiner

*Primary Examiner*—Stephen Kalafut
*Assistant Examiner*—Angela J. Martin
(74) *Attorney, Agent, or Firm*—Cohen, Pontani, Lieberman & Pavane

(57) ABSTRACT

A fuel cell system which has a fuel cell with a supply line and a discharge line for a fuel as well as a supply line and a discharge line for an oxidizing agent. Also provided is a fuel tank which contains, for example, benzene or methanol for producing the fuel for the fuel cell. To avoid the release of hydrocarbons from the fuel contained in the tank, a filter element, for example an active carbon filter, is connected to the fuel tank. To be able to regenerate the filter element, the filter element is connected to the discharge line for the oxidizing agent and/or the discharge line for the fuel. The filter element is regenerated by the flow of exhaust gas from the fuel cell. The filter element is preferably connected via a connecting line to a burner, with the result that the hydrocarbons taken up by the flow of exhaust gas can be burned in the burner. Furthermore, by designing the fuel cell system appropriately, a leakage diagnosis can also be performed in the fuel tank.

22 Claims, 1 Drawing Sheet

FUEL CELL SYSTEM AND METHOD OF REGENERATING A FILTER ELEMENT IN A FUEL CELL SYSTEM

BACKGROUND OF THE INVENTION

1. Field of the Invention

The present invention relates to a fuel cell system having a fuel cell which has a supply line and a discharge line for a fuel as well as a supply line and a discharge line for an oxidizing agent. Such a system also has a fuel tank for a fuel comprising hydrocarbons, which is connected to a filter element for preventing the release of hydrocarbons. Furthermore, the invention concerns a method of regenerating the filter element in a fuel cell system.

2. Discussion of the Prior Art

Fuel cells are already known and have gained considerably in significance in recent years, in particular in the area of the automotive industry.

In a way similar to battery systems, fuel cells generate electrical energy by chemical means, the individual reactants being continuously supplied and the reaction product being continuously removed. In this case, the fuel cells are based on the operating principle that electrically neutral molecules or atoms bond with one another and thereby exchange electrons. This process is referred to as the redox process. In a fuel cell, the oxidation and reduction processes are physically separated. The electrons given off during the reduction can be conducted as a current through a load, for example the electric motor of an automobile.

Used as gaseous reaction partners for the fuel cell are, for example, hydrogen as the fuel (anode gas) and oxygen (cathode gas) as the oxidizing agent. If it is desired to operate the fuel cells with a fuel which is readily available and easy to store, such as natural gas or methanol, the hydrocarbon must initially be converted into an oxygen-rich gas by reforming.

When filling a fuel tank with a fuel which comprises hydrocarbons and subsequently converting it into the fuel for the fuel cell, for instance by steam reforming or the like, as well as when venting the fuel tank, hydrocarbons are released in an unwanted manner. Since the hydrocarbons are harmful to the environment and, what is more, can also cause damage in the fuel cell system, they must be bound in a suitable way. This generally takes place by means of a filter element, for example an active carbon filter, as is known for fuel tanks of vehicles with internal combustion engines, for example from WO 97/33765. This filter element must be regenerated from time to time in order to ensure its serviceability. If regeneration does not take place in time, the hydrocarbons can pass through the filter element and into the atmosphere unhindered.

Similarly, hydrocarbons can also get into the atmosphere as a result of gas leaks in the tank system (cf. for example German reference DE 19818697 A).

However, legislation prescribes, for example for Germany in the form of the 21st Bundes-Immissionsschutzverordnung [German federal regulation on air pollution control] of Oct. 7, 1992, that no or only a very small amount of hydrocarbons may get into the atmosphere.

German reference DE 691 26 321 T2 (European reference EP 0559816 B) discloses a power generating system which includes, inter alia, a fuel cell system of the generic type which is provided with devices for supplying and removing fuel and oxidizing agent. Furthermore, this fuel cell system is equipped with a cleaning device for the removal of hydrocarbons. Although the cleaning device is connected to the fuel tank via a line, it does not serve for cleaning the flow of exhaust gas but for cleaning the fuel which is supplied to the fuel cell.

SUMMARY OF THE INVENTION

Setting out from this cited prior art, the present invention is therefore based on the object of improving a fuel cell system of the type mentioned above so that the that the disadvantages described are avoided. In particular, it is intended to provide a fuel cell system in which the filter element can be regenerated in a simple and reliable way. Finally, an improved method of regenerating a filter element is also to be provided.

Pursuant to these objects, and others which will become apparent hereafter, one aspect of the present invention resides in a fuel cell system in which a filter element is connected to the discharge line for the oxidizing agent and/or the discharge line for the fuel.

The fuel cell system according to the invention firstly allows the filter element to be regenerated in a simple and low-cost way. For this purpose, the flow of exhaust gas of the oxidizing agent (cathode gas) and/or the fuel (anode gas) is passed through the filter element. As a result, the filter element is regenerated by the flow of exhaust gas passed through it entraining the hydrocarbon molecules. After leaving the filter element, these molecules can then be burned, for example in a device described in more detail further below.

Using the flow of exhaust gas from the fuel cell, which is generally still under superatmospheric pressure when it leaves the fuel cell, for regenerating the filter element, makes it possible to dispense with a pump dedicated to this purpose. In the case of conventional vehicles with an internal combustion engine, the regeneration of the filter element takes place by subatmospheric pressure in a suction pipe. In the case of vehicles with fuel cells, such a subatmospheric pressure is no longer available.

An active carbon filter may be advantageously used as the filter element. Depending on requirements and the application, however, other types of filter are also conceivable, with the result that the invention is not restricted to active carbon filters.

The filter element may be connected to the discharge line for the oxidizing agent or to the discharge line for the fuel or else to both discharge lines. However, it must be ensured that the flow of exhaust gas can entrain the hydrocarbons located in the filter element. In an advantageous embodiment, the filter element is therefore connected to the discharge line for the oxidizing agent, in particular whenever oxygen is used as the oxidizing agent, an adequate amount of which is always present.

Methanol, benzene, methane, natural gas, coal gas, biogas or the like may, for example but not exclusively, be used as the fuel for the fuel cells from which the hydrogen is produced in subsequent processes. Atmospheric oxygen may be used, for example, as a suitable oxidizing agent.

The filter element can be advantageously connected via a connecting line to an arrangement for preparing/generating fuel for the fuel cell from the fuel located in the fuel tank. In this way, once it has flowed through the filter element and bound the hydrocarbons, the flow of exhaust gas from the fuel cell can be further used in the production of the fuel—for example hydrogen.

The filter element is advantageously connected via a connecting line to a burner. In this burner, which may be designed for example as a catalytic burner, the flow of exhaust gas from the fuel cell, which after leaving the filter element also contains hydrocarbons, is burned. The waste heat thereby produced can be used in generating/preparing the fuel, for instance for vaporizing the fuel in a device for gas treatment.

Consequently, passing on the stream of exhaust gas containing hydrocarbons has the additional advantage that the harmful hydrocarbons are burned and that the waste heat produced is not lost but can be utilized. Furthermore, there is no direct connection between the filter element and the atmosphere, with the result that unwanted discharge of hydrocarbons into the atmosphere during operation of the vehicle is prevented.

In a further embodiment, a valve, in particular a shut-off valve, may be provided in the connecting line between the filter element and the burner. Such a shut-off valve is advantageous if a leakage diagnosis is carried out in the fuel tank. In this case, the shut-off valve must be closed. The operating principle of such a leakage diagnosis is discussed in more detail further below.

The fuel tank may be advantageously connected to the filter element via a line, with a valve, in particular a tank protection valve designed as a pressure-relief valve, being provided in the line. The tank protection valve prevents excessive superatmospheric pressure from occurring in the fuel tank.

A valve, in particular a check valve, is preferably provided in the discharge line for the fuel and/or the oxidizing agent connected to the filter element. The check valve protects the fuel cell from hydrocarbons being able to get into the fuel cell from the filter element and damage (poison) the fuel cell.

In a further embodiment, a pressure reducer is provided in the discharge line for the oxidizing agent and/or the fuel connected to the filter element. If the fuel cell system is operated with high pressure, the pressure prevailing in the discharge line is reduced by means of the pressure reducer. In this case, an excess flow of exhaust gas can be supplied, for example via an appropriate line, to the arrangement for generating/preparing fuel, in particular the burner. The pressure reducer is advantageously designed to be closable, for example electrically closable. In particular if a leakage diagnosis, described in more detail further below, is to be carried out in the fuel tank, it must be possible for the pressure reducer to be closed.

The discharge line for the fuel and/or the discharge line for the oxidizing agent may be advantageously connected to the arrangement for generating/preparing fuel, in particular to the burner.

In a further embodiment, at least one pressure sensor is provided in the fuel tank. The pressure sensor can be used, for example in the leakage diagnosis in the fuel tank, for measuring a pressure drop taking place in the fuel tank.

According to a second aspect of the invention, a method of regenerating a filter element, in particular an active carbon filter, is provided. The filter element is provided in a fuel cell system according to the invention, as described above, and the filter element is connected in terms of lines to a fuel tank. The method is defined according to the invention wherein the flow of exhaust gas of the oxidizing agent and/or the fuel from the fuel cell is introduced into the filter element.

This provides a simple and low-cost possible way of regenerating the filter element with the advantages described above. For the advantages, consequences, effects and operating principle of the method according to the invention, reference is made to the full content of the comments made above with respect to the fuel cell system according to the invention.

The flow of exhaust gas of the oxidizing agent and/or the fuel passed through the filter element may subsequently be introduced into a device for generating/preparing fuel, in particular into a burner. In this way, the flow of exhaust gas for regenerating the filter element is initially passed through the filter element and subsequently burned together with the desorbed hydrocarbons from the filter element, for example in the burner. The harmful hydrocarbons are burned, utilizing the waste heat produced. Release of the hydrocarbons from the filter element into the environment is prevented.

In a further embodiment, the pressure of the flow of exhaust gas introduced into the filter element can, if need be, be specifically set by means of a pressure reducer, which leads to the advantages described further above.

The invention advantageously makes it possible to carry out a leakage diagnosis in a fuel tank of a fuel cell system according to the invention, as described above, the fuel tank being connected to a filter element. In this case, it is provided that a pressure reducer fitted in the discharge line for the oxidizing agent and/or the fuel from the fuel cell, connected in terms of lines to the filter element, is closed. The fuel tank is subjected to a certain superatmospheric pressure and the pressure drop in the fuel tank is measured by means of a pressure sensor.

The basic idea of this method is that, for testing the tightness of the fuel tank, the tank is subjected to a certain pressure. Since the pressure reducer is closed, the pressure cannot escape if the fuel tank is in the proper state. A pressure drop in the fuel tank can accordingly occur only in the presence of a leak. The possible pressure drop is measured by means of the pressure sensor in the fuel tank. The leakage diagnosis is advantageously carried out during the warm-running phase of the fuel cell system. If the filter element is connected via a connecting line to an arrangement for preparing/generating fuel, in particular a burner, a valve, in particular a shut-off valve, is fitted in the connecting line and has to be closed in order that the pressure built up in the fuel tank cannot escape via the filter element.

In a further embodiment, the fuel cell system according to the invention may be used in particular for operating a vehicle, in particular for electrical propulsive drive. Similarly, the method according to the invention may preferably be used for a fuel cell system for operating such a vehicle.

Fuel cell technology in the vehicle sector represents the preferred field of use of the invention. Nevertheless, other possible uses are also conceivable. To be mentioned here for example are fuel cell systems for mobile equipment through to power generating installations in which the hydrogen is produced from methanol, benzene or the like. The fuel cell technology is also suitable for the decentralized supplying of energy to households, industrial installations or the like.

The present invention is not restricted to particular types of fuel cells, with the result that the invention can be used in conjunction with all types of fuel cells. Such fuel cells are, for example, alkaline fuel cells (AFC), fuel cells with a polymer membrane (PEMFC or DMFC=direct methanol fuel cell), phosphoric acid fuel cells (PAFC), molten carbonate fuel cells (MCFC), solid oxide fuel cells (SOFC), or the like. The different types of fuel cell operate with different levels of pressure and temperature.

In a particularly preferred way, the present invention may, however, be used in conjunction with fuel cells with polymer membranes (PEM or DMFC). These fuel cells have a high electrical efficiency, cause only minimal emissions, have an optimum part-load behavior and are essentially free from mechanical wear.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The single FIGURE shows a fuel cell system according to the present invention in a schematic view.

DETAILED DESCRIPTION OF THE PREFERRED EMBODIMENTS

Figure 1:
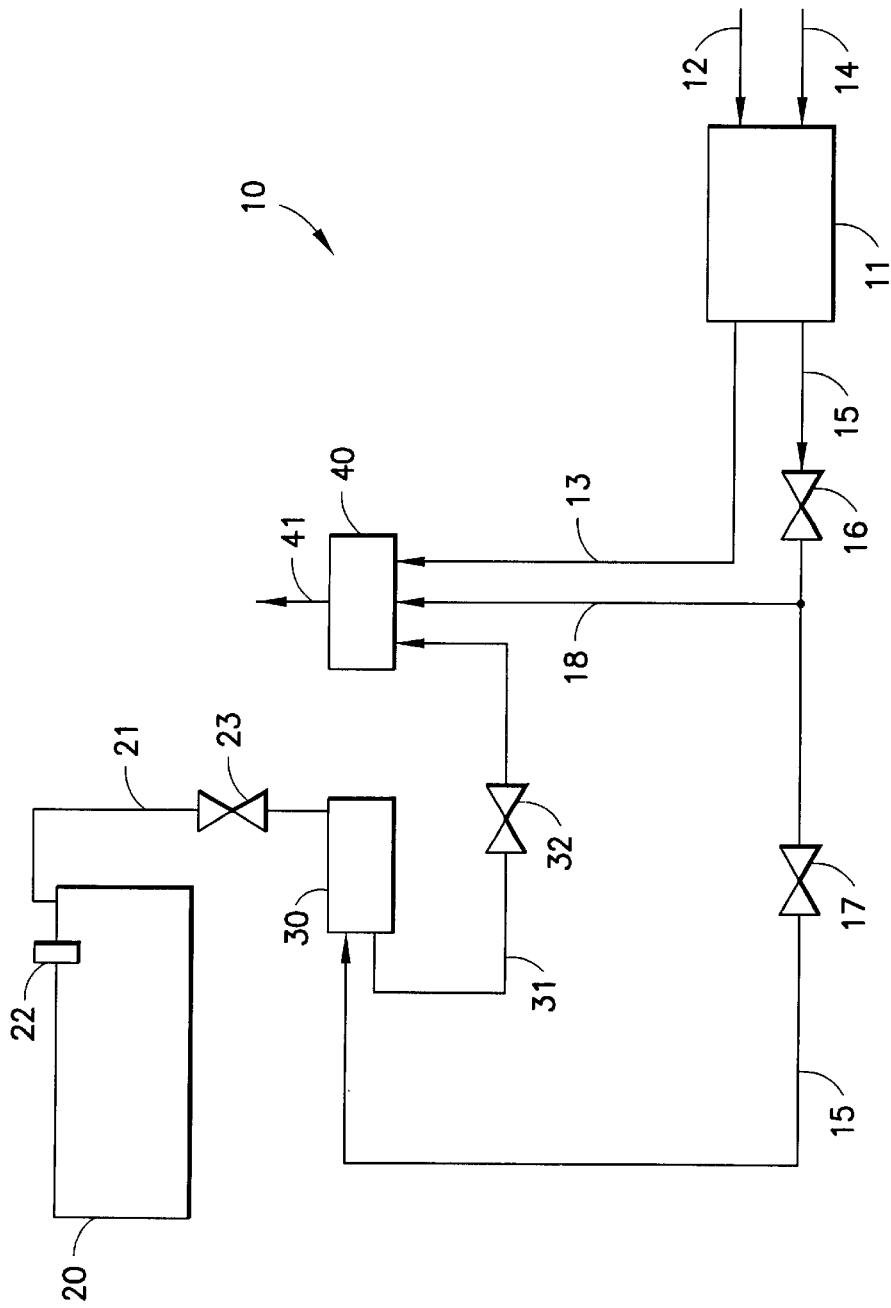

Represented in the FIGURE is a fuel cell system 10, which is used for operating a vehicle. The fuel cell system has a fuel cell 11, which usually comprises a multiplicity of fuel cell elements and has a cathode part and an anode part. The cathode part and the anode part are separated from each other by a membrane. The reduction processes required for generating the electrical energy take place in the anode part, while the corresponding oxidation processes take place in the cathode part.

The anode part is fed with a fuel, in this case hydrogen, via a supply line 12. The cathode part is fed with an oxidizing agent, in this case oxygen, via a supply line 14. After passing through the fuel cell 11, the fuel and the oxidizing agent (including the reaction products formed) are discharged from the fuel cell 11 via corresponding fuel cell discharge lines 13, 15.

The fuel cell system 10 also has a fuel tank 20, in which benzene or methanol is stored as the fuel. The hydrocarbons of the fuel are converted into an oxygen-rich gas in an arrangement (not represented) for generating/preparing fuel for the fuel cell.

Since, when filling and ventilating/venting the fuel tank 20, hydrocarbons escape from the fuel tank 20, a filter element 30, in the present case an active carbon filter, which is connected to the fuel tank 20 via a line 21, is provided. The released hydrocarbons are bound in the filter element 30, with the result that they cannot get into the atmosphere.

To prevent an excessive superatmospheric pressure from occurring in the fuel tank 20, a tank protection valve 23 (pressure-relief valve), which can close when there is excessive pressure in the filter element 30, is provided in the line 21. For measuring the pressure in the fuel tank 20, a pressure sensor 22 is provided.

The filter element 30 is also connected to the fuel cell 11 via the discharge line 15 for the oxidizing agent (cathode exhaust gas). In order to prevent hydrocarbons from being able to penetrate into the fuel cell 11 from the filter element 30, a corresponding check valve 16 is provided in the discharge line 15. In addition, the discharge line 15 has a pressure reducer 17, which reduces the flow of exhaust gas from the fuel cell 11 to a pressure suitable for the filter element 30 if the fuel cell system 10 is being operated with high pressure. An excess of exhaust gas existing in this case can be supplied via a line 18 to a burner 40, for example a catalytic burner of an arrangement for generating/preparing fuel.

The discharge line 13 for the fuel (anode exhaust gas) is similarly connected to the burner 40. The burner 40 is in turn connected via a line 41 to a device for gas treatment (not represented). In the gas treatment, the hydrogen which is subsequently supplied as fuel to the fuel cell 11 via the supply line 12 is then produced.

The filter element 30 is connected to the burner 40 via a connecting line 31, in which a shut-off valve 32 is provided.

The operating principle of the method of regenerating the filter element 30 is now described below.

The filter element 30, designed as an active carbon filter, takes up by adsorption the hydrocarbons released during the filling and venting of the fuel tank 20. In order to regenerate the filter element 30, the flow of exhaust gas of the oxidizing agent from the fuel cell is passed via the discharge line 15 into the filter element 30, where the flow of exhaust gas releases and entrains the adsorbed hydrocarbons. The temperature of the flow of exhaust gas from the fuel cell 11, lying above the ambient temperature, is beneficial for the desorption of the filter element 30. The flow of exhaust gas is passed through the filter element 30 and subsequently supplied to the burner 40. Here, the hydrocarbons and the flow of exhaust gas are catalytically burned. The waste heat thereby produced is supplied to the gas treatment via the line 41. By this type of regeneration, the harmful hydrocarbons are burned before they can escape into the atmosphere. The corresponding design of the fuel cell system 10 prevents hydrocarbons from getting into the atmosphere from the filter element 30. Since the flow of exhaust gas from the fuel cell 11 is generally introduced into the filter element 30 at superatmospheric pressure, there is no need for a separate pump for transporting the flow of exhaust gas.

The fuel stored in the fuel tank 20 is generally at subatmospheric pressure. It is consequently advisable to carry out a leakage diagnosis for the fuel tank 20 at regular intervals. Such a leakage diagnosis is advantageously carried out in the warm-running phase of the fuel cell system 10.

For this purpose, initially a certain pressure is built up in the fuel tank 20. The fuel tank 20 is advantageously subjected to a pressure which is lower than the closing pressure of the tank protection valve 23. In order to prevent the pressure from being able to escape from the fuel tank 20 via the line 21 and the filter element 30, the shut-off valve 32 in the connecting line 31 is closed. At the same time, the pressure reducer 17 in the discharge line 15 is also closed.

In such a case, the pressure set in the fuel tank 20 could escape only via a corresponding leak. The measurement of a possible pressure drop in the fuel tank 20 is performed by means of the pressure sensor 22.

The invention is not limited by the embodiments described above which are presented as examples only but can be modified in various ways within the scope of protection defined by the appended patent claims.

We claim:

1. A fuel cell system, comprising:

a fuel cell having an anode and a cathode;

a fuel supply line connected to the fuel cell so as to supply fuel to the anode of the fuel cell;

a fuel discharge line connected to the fuel cell so as to discharge an anode exhaust gas from the fuel cell;

an oxidizing agent supply line connected to the fuel cell so as to supply an oxidizing agent to the cathode of the fuel cell;

an oxidizing agent discharge line connected to the fuel cell so as to discharge a cathode exhaust gas from the fuel cell;

a fuel tank for a hydrocarbon fuel; and filter means connected to the fuel tank for preventing release of hydrocarbons, the filter means being connected to at least one of the discharge line for the oxidizing agent and the discharge line for the fuel whereby the filter means is regenerated by passing at least one of the cathode exhaust gas and the anode exhaust gas through the filter means.

2. A fuel cell system as defined in claim 1, and further comprising means for preparing/generating fuel for the fuel cell from the fuel located in the fuel tank, and a connecting line arranged to connect the filter to the means for preparing/generating fuel.

3. A fuel cell system as defined in claim 1, and further comprising a burner and a connecting line arranged to connect the filter means to the burner.

4. A fuel cell system as defined in claim 2, and further comprising a valve arranged in the connecting line.

5. A fuel cell as defined in claim 4, wherein the valve is a shut-off valve.

6. A fuel cell system as defined in claim 3, and further comprising a valve arranged in the connecting line.

7. A fuel cell as defined in claim 6, wherein the valve is a shut-off valve.

8. A fuel cell system as defined in claim 1, and further comprising a connecting line that connects the fuel tank to the filter means, and a shut-off valve arranged in the connecting line.

9. A fuel cell system as defined in claim 8, wherein the shut-off valve is a pressure-relief valve that functions as a tank protection valve.

10. A fuel cell system as defined in claim 1, and further comprising a valve provided in at least one of the discharge line for the oxidizing agent and the discharge line for the fuel connected to the filter means.

11. A fuel cell system as defined in claim 10, wherein the valve is a check valve.

12. A fuel cell system as defined in claim 1, and further comprising a pressure reducer provided in at least one of the discharge line for the oxidizing agent and the discharge line for the fuel connected to the filter means.

13. A fuel cell system as defined in claim 2, wherein at least one of the discharge lines for the fuel and the discharge line for the oxidizing agent is connected to the means for generating/preparing fuel.

14. A fuel cell system as defined in claim 13, wherein the means for generating and preparing fuel includes a burner, the at least one of the discharge line for the fuel and the discharge line for the oxidizing agent being connected to the burner.

15. A fuel cell system as defined in claim 1, and further comprising at least one pressure sensor provided in the fuel tank.

16. A fuel cell system as defined in claim 1, wherein the filter means is an active carbon filter.

17. A method of regenerating a filter element which is provided in a fuel cell system having a fuel cell with an anode and a cathode, a fuel supply line connected to the fuel cell so as to supply fuel to the anode of the fuel cell, a fuel discharge line connected to the fuel cell so as to discharge an anode exhaust gas from the fuel cell, an oxidizing agent supply line connected to the fuel cell so as to supply an oxidizing agent to the cathode of the fuel cell, an oxidizing agent discharge line connected to the fuel cell so as to discharge a cathode exhaust gas from the fuel cell, a fuel tank for a hydrocarbon fuel, and a filter element connected to the fuel tank for preventing release of hydrocarbons, the method comprising the step of passing at least one of a flow of cathode exhaust gas and anode exhaust gas from the fuel cell through the filter element so as to regenerate the filter element.

18. A method as defined in claim 17, and further comprising introducing at least one of the flow of exhaust gas of the oxidizing agent and the fuel passed through the filter element into a device for generating/preparing fuel.

19. A method as defined in claim 18, including introducing the flow into a burner of the device for generating/preparing fuel.

20. A method as defined in claim 17, including setting pressure of the flow of exhaust gas introduced into the filter element with a pressure reducer.

21. A fuel cell system as defined in claim 1, wherein the system is part of a vehicle drive system.

22. A fuel cell system as defined in claim 21, wherein the vehicle drive system is an electric propulsive drive.

* * * * *